United States Patent
Rich

(10) Patent No.: US 10,914,148 B2
(45) Date of Patent: Feb. 9, 2021

(54) HYDRAULIC BALL GUIDE FOR SUBSURFACE BALL VALVES

(71) Applicant: Jerry Rich, Bakersfield, CA (US)

(72) Inventor: Jerry Rich, Bakersfield, CA (US)

(73) Assignee: Jerry Rich, Bakersfield, CA (US)

( * ) Notice: Subject to any disclaimer, the term of this patent is extended or adjusted under 35 U.S.C. 154(b) by 0 days.

(21) Appl. No.: 16/181,264

(22) Filed: Nov. 5, 2018

(65) Prior Publication Data

US 2020/0141210 A1     May 7, 2020

(51) Int. Cl.
| | |
|---|---|
| *E21B 43/12* | (2006.01) |
| *E21B 34/08* | (2006.01) |
| *F16K 25/04* | (2006.01) |

(52) U.S. Cl.
CPC ............ *E21B 43/127* (2013.01); *E21B 34/08* (2013.01); *E21B 43/126* (2013.01); *F16K 25/04* (2013.01); *E21B 2200/04* (2020.05)

(58) Field of Classification Search
CPC .. E21B 34/08; E21B 43/126; E21B 2034/002; E21B 2043/125; E21B 43/127; E21B 43/122; F16K 25/04; F16K 15/042
See application file for complete search history.

(56) References Cited

U.S. PATENT DOCUMENTS

| | | | | |
|---|---|---|---|---|
| 4,229,149 | A * | 10/1980 | Turner .................. | F04B 53/126 417/554 |
| 6,685,451 | B1 * | 2/2004 | Ivey ........................ | F04B 47/02 137/533.19 |
| 8,522,882 | B2 | 9/2013 | Rich | |
| 8,701,755 | B2 | 4/2014 | Rich | |
| 9,033,688 | B2 | 4/2015 | Kowalchuk | |
| 9,890,780 | B2 | 2/2018 | Kowalchuk | |
| 10,174,752 | B2 * | 1/2019 | Downing ................ | F04B 47/02 |
| 10,184,314 | B1 * | 1/2019 | Bair ........................ | E21B 34/06 |
| 10,550,950 | B2 * | 2/2020 | Bair ........................ | E21B 34/06 |
| 2010/0269928 | A1 * | 10/2010 | Ford ....................... | F16K 15/04 137/533.11 |
| 2020/0011154 | A1 * | 1/2020 | Stachowiak, Jr. .... | E21B 43/127 |

OTHER PUBLICATIONS

Specification for Subsurface Sucker Rod Pumps and Fittings, published by the American Petroleum Institute, Eleventh Edition, Jun. 2001.
Field-Driven Initiative to Improve Artificial Lift Efficiency and Reliability With an Engineered Sucker Rod Pump Ball Valve Insert, www.tangentflow.com/vortex-technology.

* cited by examiner

Primary Examiner — Michael R Wills, III

(57) ABSTRACT

An improved ball valve on a pump system comprising a ball valve having a ball, a first end arranged for operatively engaging the pump system, a first axial port on the first end sufficiently narrow to prevent the passage of the ball, a ball-seat disposed on the first end with a plurality of ports annularly disposed around the ball and extending through the ball-seat, a second axial port on a second end sufficiently narrow to prevent the passage of the ball, and the second end of the ball valve arranged for connecting to the pump system. The improved ball valve further comprising a ball seat without a first axial port. The improved ball valve further comprising a plurality of ports extending outwardly from the first axial port and extending through the ball-seat.

6 Claims, 6 Drawing Sheets

HYDRAULIC BALL GUIDE FOR SUBSURFACE BALL VALVES

FIELD OF THE INVENTION

The present invention and its various embodiments relate to subsurface pumping components. More specifically, the present invention relates generally to the use of hydraulic pressure to prevent internal wear and tear to balls in ball valves in subsurface pump components.

BACKGROUND OF THE INVENTION

A complete understanding of this invention can be gained through reference to the drawings in conjunction with a thorough review of the disclosure herein.

A standard pump system typically comprises an above-ground pumping unit (see, e.g., U.S. Pat. No. 5,505,258, FIG. 1, reference nos. 23 and 11) that actuates subsurface (also known as "down-hole") pump systems and components. A standard subsurface pump system typically includes a hole casing, tube or barrel, barrel coupling, a plunger, a traveling valve, a standing valve and a seating assembly. A sucker rod assembly slidably disposed within the barrel during drilling operations typically connects a pumping unit to subsurface pump components. In a standard configuration, sucker rod components are threadably connected to a connector on a standard American Petroleum Institute (herein "API") plunger.

The API develops natural gas and petrochemical equipment and operating standards for subsurface components in the petro-chemical industry. The API's standards, which are largely incorporated into state and federal regulations and followed by the petrochemical industry, are codified in the API Technical Data Book. A copy of the API Technical Data Book is referenced and disclosed with the filing of this application.

A sucker rod plunger is no more than a cylinder or tube, typically comprising two sections or chambers. One chamber is stationary or secured to the tubing. The other chamber travels with the sucker rod string. There is usually one valve disposed within each of these sections that either open or close on an alternating upstroke and downstroke of a pump through which fluids flow through axial ports or bores disposed at both ends of each valve. The traveling valve, as its name suggests, operates within the traveling chamber that is typically disposed on the upper end of the plunger. Conversely, the standing valve is typically disposed on the stationary section of the plunger engaging the pump barrel. Working in conjunction with each other on upstroke and downstroke, these valves transfer fluid from a bottom chamber to a top chamber and ultimately into production tubing and into a wellhead.

A traveling valve closes a barrel chamber on an upstroke of a pump and is usually a closed or open cage system with different arrangements for connecting to various plunger types. A traveling ball valve traditionally comprises a valve housing, a ball cage, a ball seat (usually a removable annular ring resting over an axial bore on a bottom end of the valve) and a ball internally disposed and freely floating in an internal chamber of the travelling valve. On the down stroke of the pump, the ball in the traveling valve is un-seated, allowing fluids to travel up through a lower axial port around the ball and upward through an upper axial port and into production tubing. On upstroke, downward pressure forces the ball against the ball seat closing the axial port.

The action of the fluids on the ball during down stroke when the ball is unseated displaces it inside the traveling ball valve chamber causing the ball to "beat" against the walls of the traveling valve as the fluids travel around the ball and through the upper axial port and into production tubing. Because of the incredibly high fluid pressures acting against the ball, the beating of the ball against the valve walls will often cause severe damage to the valve. Similarly, the beating action of a ball in a standing ball valve occurs on upstroke for the standing valve. Further, the constant friction between the ball and the axial port and ball seat causes chipping and wear around the port and ball seat causing leakage. To replace a valve after it gets worn out means that the plunger must be extracted from the pump. Since plungers are oftentimes thousands of feet underground, pulling the sucker rod string and the plunger to replace worn valves or other subsurface parts requires many hours, sometimes days, of lost production resulting in the loss of tens of thousands and/or hundreds of thousands of dollars.

In an attempt to get around the above-described problem, prior art valves either incorporate bored channels or grooves internal to the ball cage to direct fluid flow around the ball or, more commonly, ball cage inserts are used to trap the ball in the valve chamber. (E.g., see, Field-Driven Initiative To Improve Artificial Lift Efficiency And Reliability With An Engineered Sucker Rod Pump Ball Valve Insert disclosed with this Application) The end result of both attempts at overcoming the beating problem of the ball have not prevented damage to the internal wall of the valve, friction between the ball and the ball seat around the axial port, or the needed replacement of ball valve inserts. Even the most optimized ball cage inserts will need to be replaced after extended use.

What is needed is an improved ball valve that does not rely on the limited prior art designs and technology but, instead, allows for a simpler and more effective valve design that uses hydraulic pressure created by pump upstroke or downstroke to hydraulically contain the ball to prevent beating and overcome the internal wear of valve cages.

SUMMARY OF THE INVENTION

One aspect of the present invention provides for an improved traveling ball valve on a pump system comprising: a pumping unit, a pump barrel, a reciprocating plunger disposed within the pump barrel, a sucker rod string operatively connecting the plunger to the pumping unit, the plunger further comprising a slidably disposed valve, the slidably disposed valve further comprising: a ball, a first end arranged for operatively engaging the sucker rod string, a first axial port sufficiently narrow to prevent the passage of the ball, a ball-seat disposed on a second end with a second axial port sufficiently narrow to prevent the passage of the ball, a plurality of ports annularly disposed on and extending through the ball-seat, and the second end of the slidably disposed valve arranged for connecting to a seat plug.

Another aspect of the present invention provides for an improved stationary ball valve on a pump system comprising: a pumping unit, a pump barrel, a reciprocating plunger disposed within the pump barrel, a sucker rod string operatively connecting the plunger to the pumping unit, the plunger further comprising a stationary valve, the stationary valve further comprising: a first end operatively engaging the plunger, a ball, a ball-seat disposed on the first end with an axially disposed port sufficiently narrow to prevent the passage of the ball, a plurality of ports annularly disposed on and extending through the ball-seat, and a second end of the standing valve operatively engaging the pump barrel.

Another aspect of the present invention further provides a concave ball seat on either the slidably disposed valve or the stationary valve.

In another aspect of the present invention, there is provided an improved valve system on a subsurface pump system comprising: a pumping unit, a pump barrel, a reciprocating plunger disposed within the pump barrel, a sucker rod string operatively connecting the plunger to the pumping unit, the plunger further comprising a slidably disposed valve, the slidably disposed valve further comprising: a first end arranged for operatively engaging the sucker rod string, a ball, a ball-seat disposed on the first end with an axially disposed port sufficiently narrow to prevent the passage of the ball, a plurality of ports annularly disposed on and extending through the ball-seat, and a second end of the slidably disposed valve arranged for connecting to a seat plug; and a stationary valve comprising a first end operatively engaging the plunger, a ball, a ball-seat disposed on the first end with an axially disposed port sufficiently narrow to prevent the passage of the ball, a plurality of ports annularly disposed on and extending through the ball-seat, with a second end of the stationary valve operatively engaging the pump barrel.

In a preferred embodiment of the present invention, the end comprising a plurality of annular ports creating hydraulic pressure to cage the ball on either the slidably disposed valve or the stationary valve does not have an axial port.

DETAILED DESCRIPTION

Figure 9:
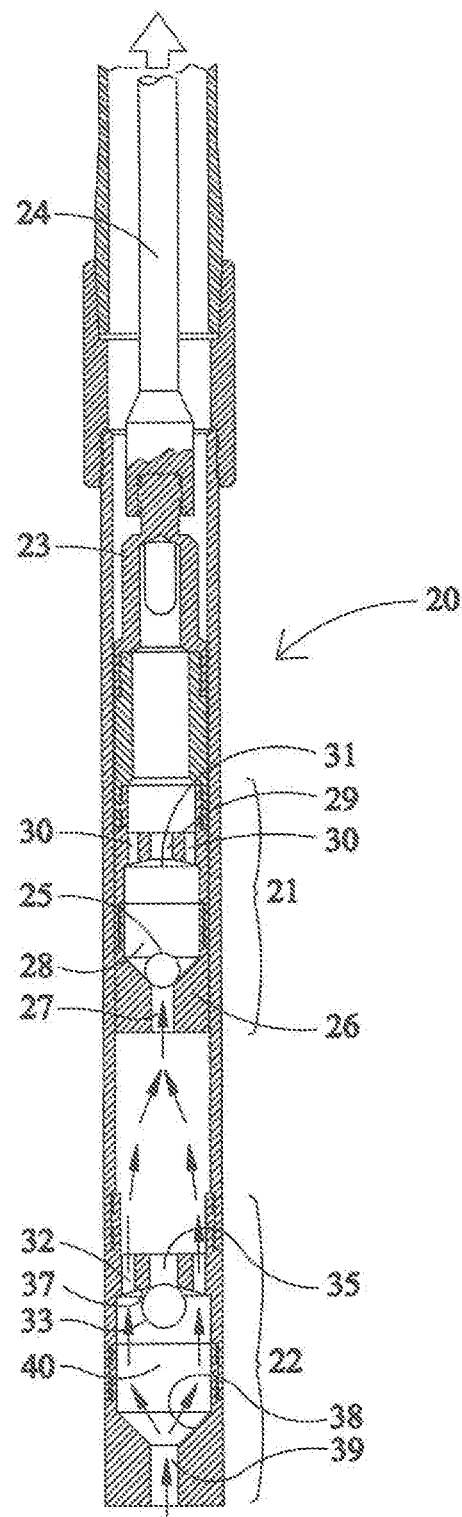
FIG. 9 is a cross-sectional view of an assembled plunger showing fluid action through directional arrows on an upstroke of a plunger.

In reference to FIG. 9, on upstroke of a pump system 20, a traveling ball valve 21 is disposed on the lower end of a plunger 23 engaging a sucker rod string 24. During upstroke, well fluid pressure seats the ball 25 of the traveling ball valve 21 against a seat plug 26 resulting from well fluid pressure created by the pump action of the pump system 20. During upstroke, an upper axial port 29 is open while a lower axial port 27 is closed when fluid pressure seats the ball 25 against the seat plug 26 preventing well fluids from flowing up through the lower axial port 27 and into the traveling ball valve chamber 28.

Figure 3:
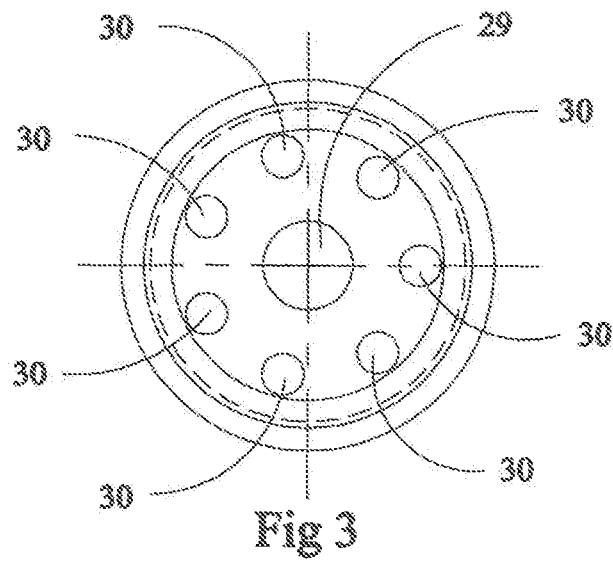
FIG. 3 is a top plan view of the traveling ball valve of FIG. 1, having hydraulic ports and an axial port on a ball seat.
Figure 2:
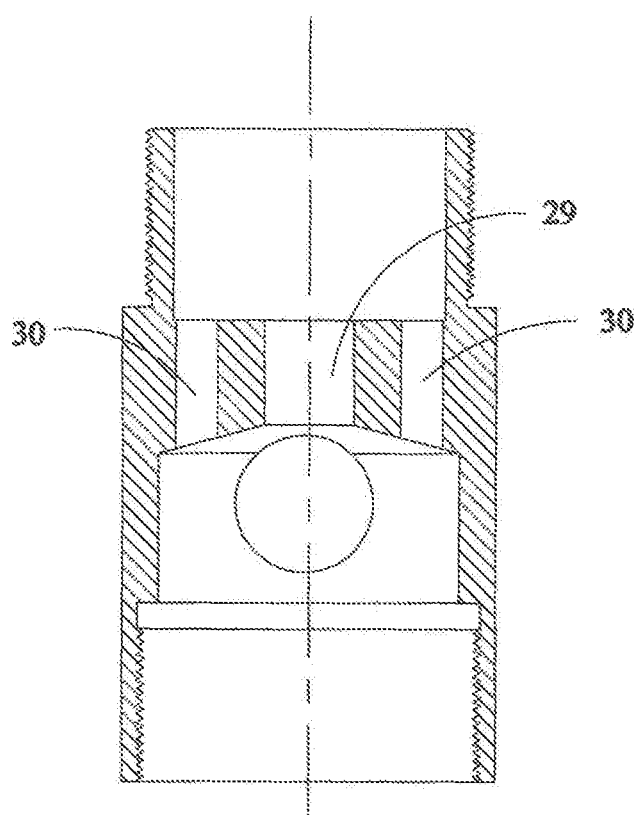
FIG. 2 is a cross-sectional view of an assembled traveling ball valve with only hydraulic ports on a ball seat on an upper end of the valve and an axial port on a lower end.
Figure 1:
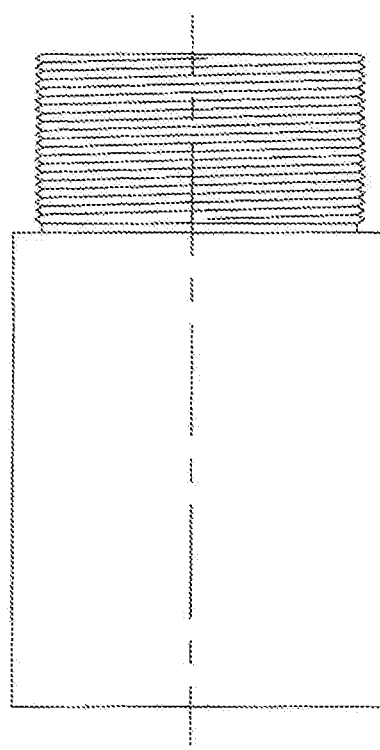
FIG. 1 is an external view of an assembled traveling ball valve.
Figure 10:
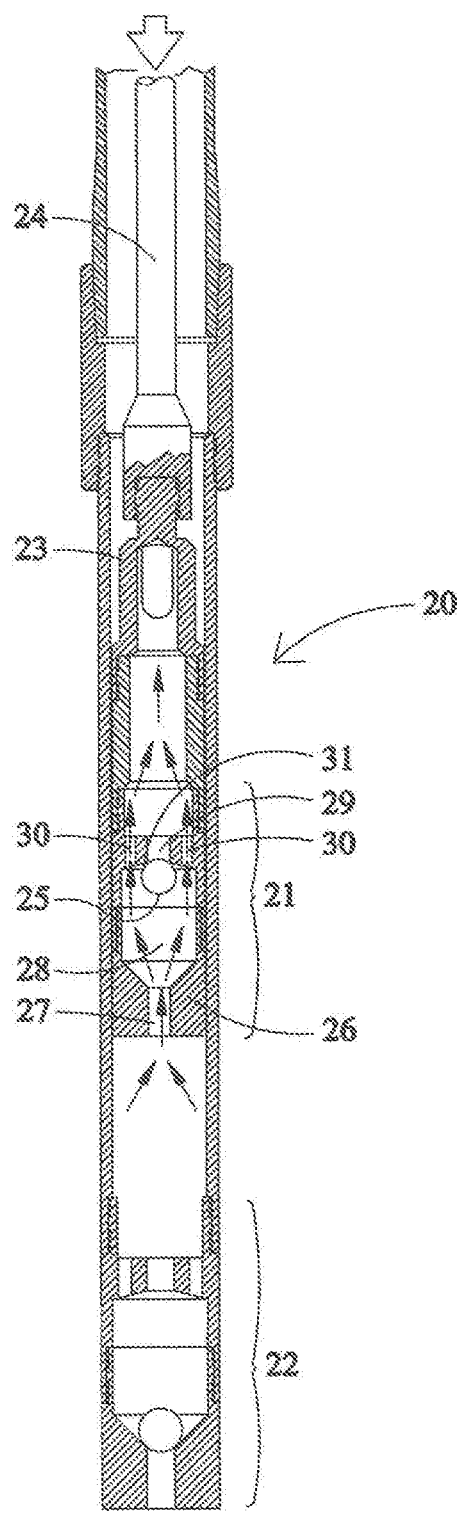
FIG. 10 is a cross-sectional view of an assembled plunger showing fluid action through directional arrows on a downstroke of a plunger.

On downstroke, as referenced in FIGS. 2, 3, and 10, the ball 25 of the traveling ball valve 21 is unseated from the seat plug 26 because of hydraulic pressure resulting from the pump action of the pump system flowing up from the lower axial port 27, which pushes the ball 25 against a ball seat 31. During downstroke, well fluid pressure being forced up through the axial port 27 flows around the ball 25 and through a plurality of hydraulic ball guide ports 30 that extend through the ball seat 31 to allow well fluids to flow from the traveling ball valve chamber 28 and up through production tubing of the pump system 20. The plurality of hydraulic ball guide ports flow around the ball 25 thereby creating a hydraulic ball guide for the ball 25, causing it to remain in the interior of the traveling ball valve chamber 28 and preventing it from beating against the interior of the traveling ball valve 21.

In a preferred embodiment, as referenced in FIG. 10, the ball seat 31 has a concave interior adjacent to the traveling ball valve chamber 28 that seats the ball 25. In prior art traveling ball valves without hydraulic ball guide ports, ball beating is primarily caused by well fluids flowing up from a lower axial port 27 under extreme pressure being forced around a ball and into an upper axial port 29 and into production tubing. As well fluids are forced into production tubing, uneven pressure rapidly displaces the ball around the prior art traveling ball valve chamber. To compensate for this uneven pressure, in a preferred embodiment referenced in the present invention, hydraulic ball guide ports 30 allow well fluids to be evenly applied around the ball forcing the ball 25 to a central interior of the traveling ball valve chamber 28, causing the ball 25 to seat against the upper axial port 29.

Figure 7:
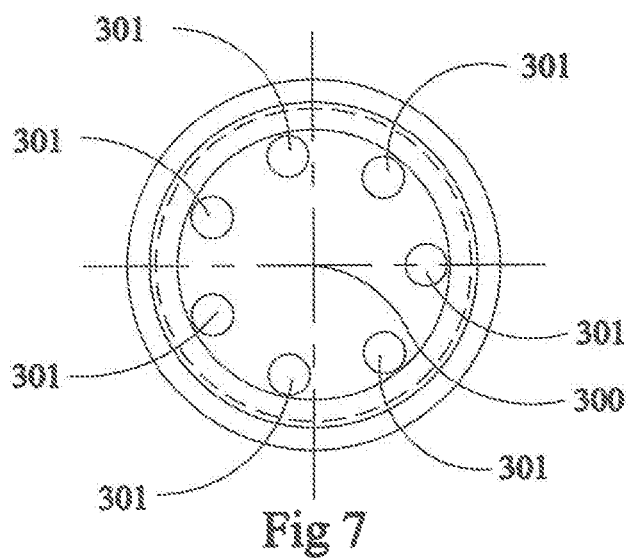
FIGS. 7 and 8 are top plan and bottom plan views, respectively, of a ball valve with hydraulic ports on a ball seat and an axial port on an opposite end of the ball valve.
Figure 8:
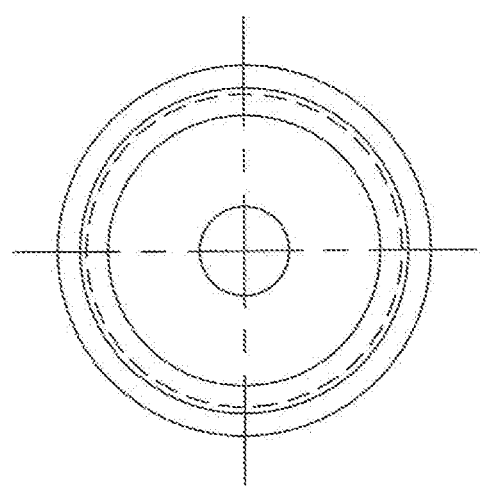

Because the upper axial port 29 is closed on downstroke in the above-described preferred embodiment of the present invention, in another preferred embodiment, as is illustrated in FIG. 7, an axial port disposed on a ball seat of a ball valve is eliminated 300. In this embodiment, whether it be for a standing ball valve or a traveling ball valve, since the hydraulic ball guide ports 301 allow channels for well fluids to travel up into production tubing, an upper axial port is not needed.

As is further shown in FIG. 9, a standing ball valve 22 works similar to that of the traveling ball valve 21 except that, on downstroke, the pressure of well fluids closes a ball 33 on the standing ball valve 21, which seats against a ball seat 38 and closes a lower axial port 39 on the standing ball valve 22. Conversely, on upstroke, well fluids travel around the ball 33 and flow up through hydraulic ball guide ports 32 on the standing ball valve 21. The well fluid pressure on upstroke un-seats the standing ball 33 and allows well fluids to flow through a lower axial port 39 on the standing ball valve 22 and into a standing ball valve chamber 40. Similar to the traveling valve as explained above and in FIG. 10, the ball 33 is forced against an upper standing valve ball seat 37 and closes an upper standing valve axial port 35. As can be deduced from the above description, alternating upstrokes and downstrokes repeat this process for both traveling and standing ball valves.

Figure 4:
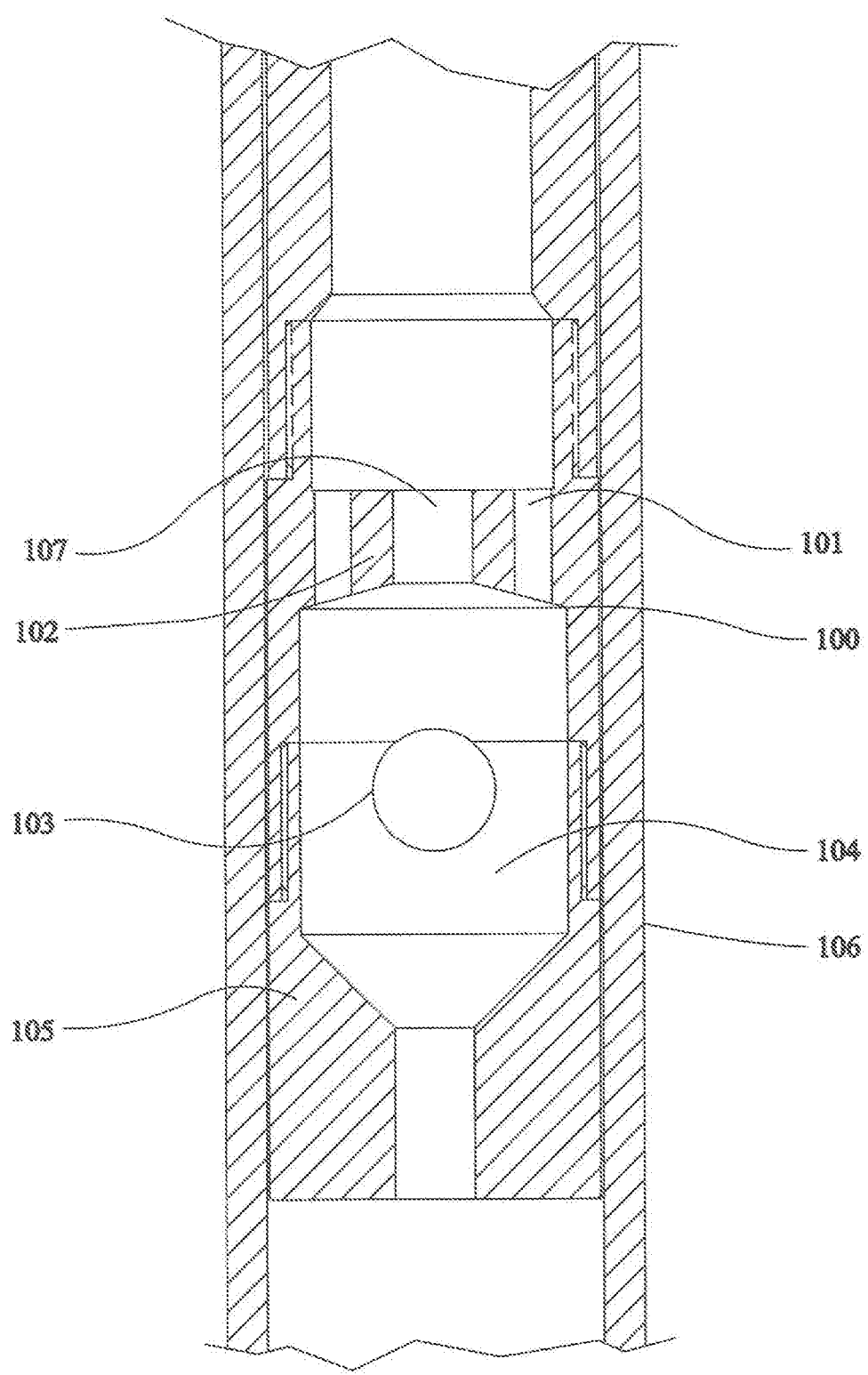
FIG. 4 is a cross-sectional view of an assembled standing ball valve with hydraulic ports on a ball seat and having axial ports on a lower end and on an upper end of the valve.
Figure 5:
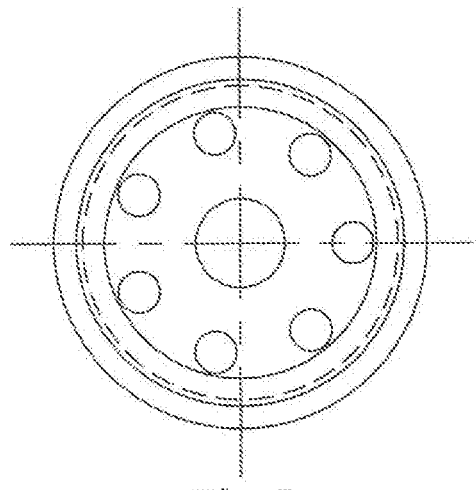
FIGS. 5 and 6 are top plan and bottom plan views, respectively, of a ball valve with hydraulic ports on a ball seat and axial ports on opposite ends of the ball valve.
Figure 6:
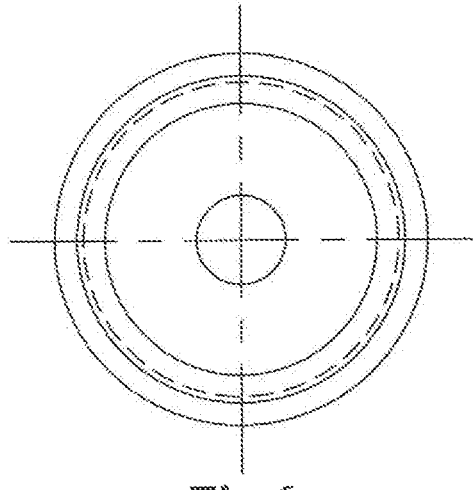

In a preferred embodiment, and similar to a traveling valve, FIG. 4 shows a cross-sectional view of an assembled standing ball valve 100 having hydraulic ball guide ports 101 on a ball seat 102, a ball 103, a valve chamber 104, and a bottom portion of the standing ball valve 105, which can be connected to either a pump barrel or tubing seat 106 on a lower portion of the standing ball valve 100. In the embodiment shown in FIG. 4, there is an axial port 107. However, as described in a preferred embodiment above (See FIG. 7), the axial port 107 can be removed from the standing ball valve 100.

Figure 11A:
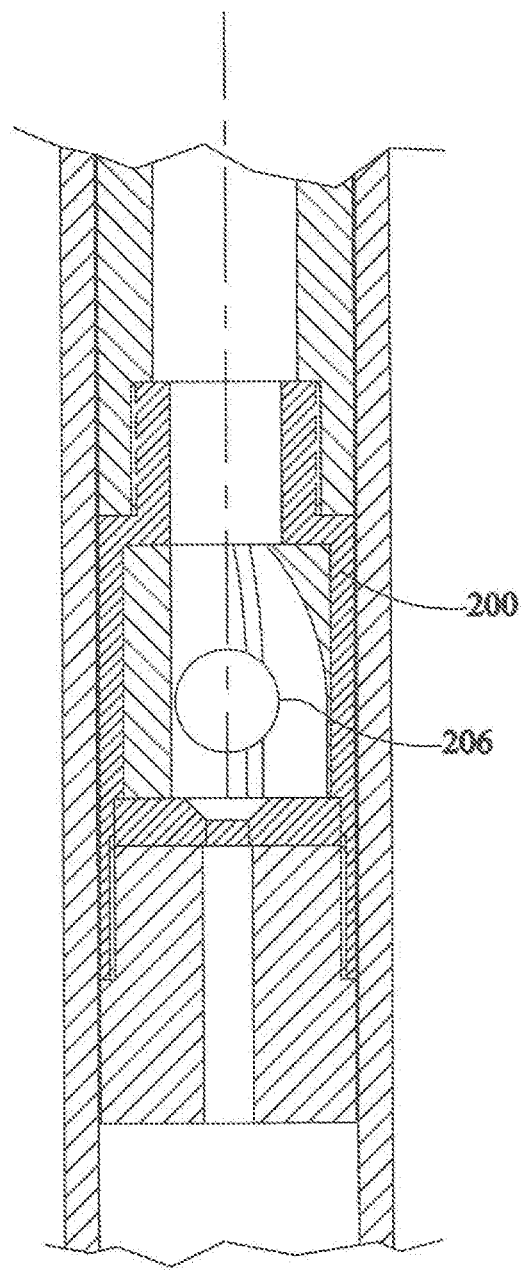
FIG. 11a is a cross-sectional view of a ball valve with an axial port disposed in a Borromean-ring type configuration.
Figure 11B:
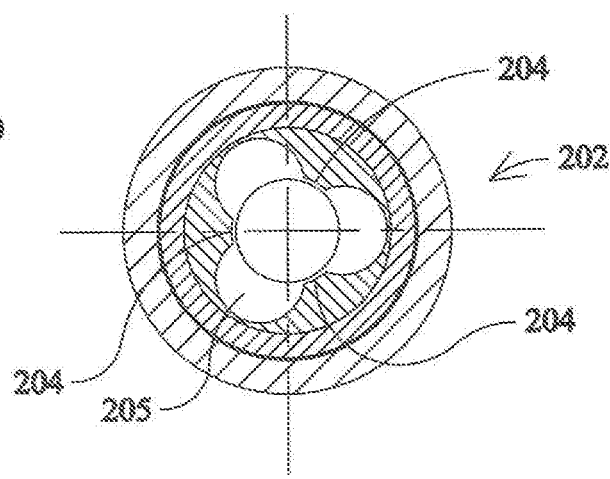
FIG. 11b is a top plan view of the ball valve embodiment depicted in FIG. 11a having an axial port disposed in a Borromean-ring type configuration.

In another preferred embodiment as shown in FIGS. 11a and 11b, a ball valve 200 comprises an axial port that is disposed in a Borromean ring-type (intersecting circles) 205 arrangement 202 as seen in a top plan view 202 in FIG. 11b. In this embodiment, the points of intersection 204 between the intersecting circles 205 are disposed inwardly and interior to the valve sufficiently to prevent the passage of a ball 206. The protruding circles 205 in this embodiment provide sufficient well-fluid passage and hydraulic pressure to cage the ball 206 and allow well fluid to pass into production tubing.

While the above description contains various preferred, exemplary, and other specific embodiments, these should not be construed as limitations on the scope of the invention or the various shapes accommodating it, but as exemplifications of the presently preferred embodiments thereof. Many other ramifications and variations are possible within the teaching of the invention. Thus the scope of the invention should be determined by the appended claims and their legal equivalents, and not solely by the examples given.

What is claimed is:

1. An improved traveling ball valve on a pump system comprising: a pumping unit, a pump barrel, a reciprocating plunger disposed within the pump barrel; a sucker rod string operatively connecting the plunger to the pumping unit; the plunger further comprising a slidably disposed valve; the slidably disposed valve further comprising: a valve chamber, a ball freely disposed within the valve chamber, a first end arranged for operatively engaging the sucker rod string, a first axial port on the first end sufficiently narrow to prevent the passage of the ball, a ball-seat disposed on the first end with a plurality of ports annularly disposed on and extending through the ball-seat into the valve chamber adapted for producing a hydraulic cage around the ball on downstroke of the pump system, a second axial port on a second end sufficiently narrow to prevent the passage of the ball, and the second end of the slidably disposed valve arranged for connecting to a seat plug.

2. The pump system of claim 1 further comprising a ball seat without a first axial port.

3. An improved standing ball valve on a pump system comprising: a pumping unit, a pump barrel, a reciprocating plunger disposed within the pump barrel; a sucker rod string operatively connecting the plunger to the pumping unit; the plunger further comprising a standing valve; the standing valve further comprising: a first end operatively engaging the plunger, a valve chamber, a ball freely disposed within the valve chamber, a ball-seat disposed on the first end with an axial port sufficiently narrow to prevent the passage of the ball, a plurality of ports annularly disposed on and extending through the ball-seat into the valve chamber adapted for producing a hydraulic cage around the ball on upstroke of the pump system, and a second end of the standing valve operatively engaging the pump barrel.

4. The pump system of claim 3 further comprising a ball seat without a first axial port.

5. An improved ball valve on a pump system comprising: a pumping unit, a pump barrel, a reciprocating plunger disposed within the pump barrel; a sucker rod string operatively connecting the plunger to the pumping unit; the plunger further comprising a ball valve; the ball valve further comprising: a valve chamber, a ball freely disposed within the valve chamber, a first end arranged for operatively engaging the pump system, a first axial port on the first end sufficiently narrow to prevent the passage of the ball; the first axial port further comprising a plurality of ports extending outwardly from the first axial port and extending through the ball-seat into the valve chamber adapted for producing a hydraulic cage around the ball during a stroke of the pump system, a second axial port on a second end sufficiently narrow to prevent the passage of the ball, and the second end of the ball valve arranged for operatively engaging the pump system.

6. The pump system of claim 5 further comprising a ball seat without an axial port.

* * * * *